United States Patent [19]

Flückiger

[11] Patent Number: 4,730,821

[45] Date of Patent: Mar. 15, 1988

[54] DEVICE FOR SEPARATING PREFOLDED, FOLDABLE SHEETS

[75] Inventor: Daniel Flückiger, Walkringen, Switzerland

[73] Assignee: Hasler AG, Bern, Switzerland

[21] Appl. No.: 909,781

[22] Filed: Sep. 19, 1986

[30] Foreign Application Priority Data

Sep. 20, 1985 [CH] Switzerland ............. 04083/85

[51] Int. Cl.⁴ ................. B65H 39/02; B65H 7/02
[52] U.S. Cl. ................. 270/58; 271/259; 271/261; 271/265; 271/222
[58] Field of Search ........... 270/58; 271/221, 222, 271/147, 152–155, 264, 265, 258–261, 9

[56] References Cited

U.S. PATENT DOCUMENTS

| | | |
|---|---|---|
| 3,194,126 | 7/1965 | Larsson ............. 271/221 |
| 3,370,848 | 2/1968 | Bartlett ............. 271/222 |
| 3,825,250 | 7/1974 | Miller ............. 270/58 |
| 3,926,427 | 12/1975 | Moksnes ............. 271/9 |
| 4,062,532 | 12/1977 | Peter et al. ............. 271/221 X |
| 4,203,334 | 5/1980 | Zettler ............. 270/58 X |
| 4,206,995 | 6/1980 | Legg ............. 271/261 X |
| 4,657,236 | 4/1987 | Hirauawa et al. ............. 271/265 |

Primary Examiner—E. H. Eickholt
Attorney, Agent, or Firm—Horst M. Kasper

[57] ABSTRACT

The device includes a side wall (13), which leaves open a slot (15) of a variable width relative to a support (11). The flaps of letter envelopes are inserted into the slot (15) angled at 90 degrees, where the letter envelopes rest in a stack on the support (11) and are maintained on their side by the side wall (13). Three sensors (36, 38, 39) serve to provide signals for a motor control of the position of the side wall. The side wall can be manually moved against the force of a spring (26).

19 Claims, 5 Drawing Figures

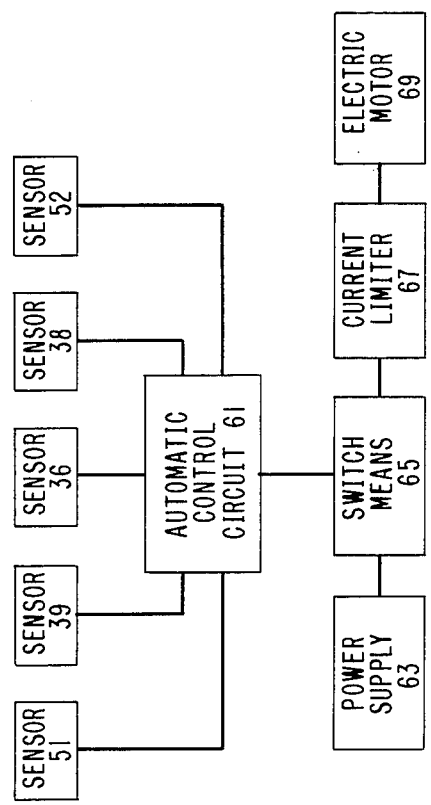
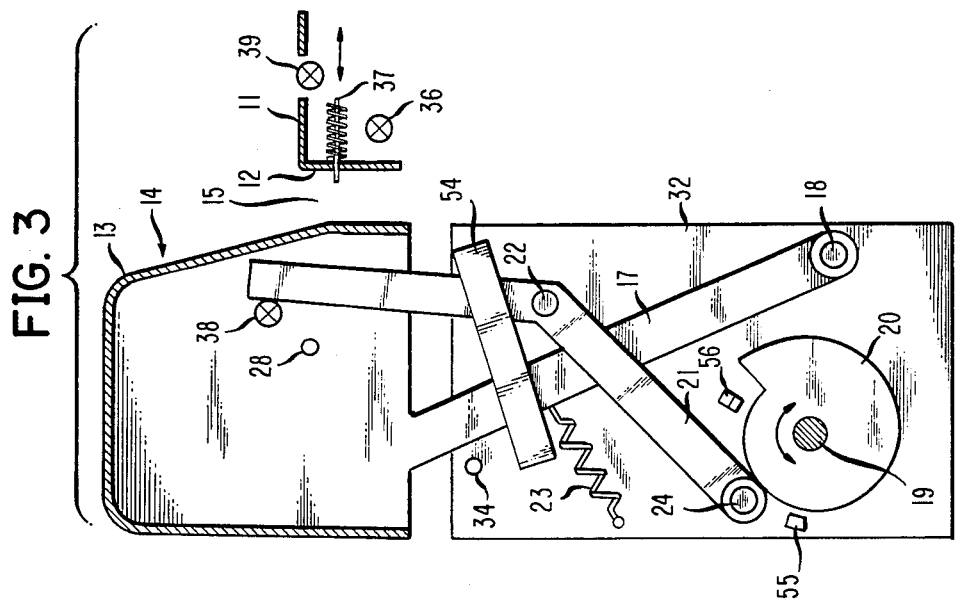

DEVICE FOR SEPARATING PREFOLDED, FOLDABLE SHEETS

BACKGROUND OF THE INVENTION

1. Field of the Invention

The invention relates to a device for separating prefolded, foldable sheet pieces, in particular letter envelopes with flaps.

2. Brief Description on the Background of the Invention Including Prior Art

Separator devices for letter envelopes are known in postage metering machines such as, for example, described in Hasler Review, Vol 11, 1978, Issue No. 1, pp 1-7. In such devices the letter envelopes are placed with flaps closed as a stack on a support as shown in FIG. 3 of the reference above. In each case, the lowest envelope is pulled away in longitudinal direction and fed to the postage metering section by a feed device, for example, rollers with a good gripping surface (Compare FIG. 1 of the reference). According to this procedure, the flap can in each case be open to some extent, can be moistened, can be reclosed and can be adhesively attached under pressure (Compare the sections 2.3.2 and 2.3.3 on page 7 of the above reference).

Furthermore, postage metering machines are known where the stack of letter envelopes can be inserted with the flaps open at an about right angle. Because of the thickness of the paper, stampings at an angle result because of the manner of stacking. The stacks have to be maintained at their side in order to provide a sufficiently accurate positioning for the stack. Furthermore, a slot has to be located between the side wall and the support of the stack in each case, and the flaps of the envelopes drop down into the slot.

Because of the slot however, an exact side guide is only provided to a limited extent such that the position at which the postage stamp is placed on the envelope is subject to variations. Furthermore, it easily occurs that envelopes are stamped at an angle, which is not permissible in the case of high quality requirements.

SUMMARY OF THE INVENTION

1. Purposes of the Invention

It is an object of the present invention to provide a separating device for stacks of letter envelopes with flaps opened at an angle.

It is a further object of the present invention to provide an improved guiding in a postage metering machine for letter envelopes with an open flap.

It is yet another object of the present invention to provide a letter postage metering machine which is capable of accepting letter envelopes with opened flaps in stacks of variable size.

These and other objects and advantages of the present invention will become evident from the description which follows.

2. Brief Description of the Invention

The present invention provides a device for isolating of prefolded, foldable sheet pieces that includes a support for a stack of sheet pieces. The support has a ledge joining it at an edge at an about 90 degree angle. A side wall is disposed opposite to the ledge and makes an absolute angle of more than about 60 degrees with a plane of the support for supporting and guiding the placed sheet pieces at a side of the sheet pieces. A slot, with an adjustable width and adapted for receiving prefolded sections of sheet pieces, is formed between the ledge of the support and the side wall. A sheet piece separator is provided for the serial removal of a lowest level sheet piece in each case. An electromechanical drive means is connected to the side wall for changing the width of the slot. A control system provided to actuate the electromechanical drive is connected to a first sensor disposed at the support, where the first sensor responds to sheet pieces placed on the support. A second sensor connected to the control system is disposed at the ledge of the support and responds to a force directed against the ledge of the support. A third sensor, disposed at the side wall and connected to the control system, responds to a motion of the side wall for expanding the slot. A spring elastic connection is provided between the electromechanical drive and the side wall.

The electromechanical drive means can include an electric motor and can further comprise a cam disk coupled to the electric motor, a first axle rotatably supporting a drive lever that engages the cam disk and a second axle for tiltably supporting the side wall. A rest position can be provided to the side wall and to the drive lever by including a pretensioned spring and a detent stop in the spring elastic connection, where then the drive lever and the side wall are under the action of the pretensioned spring. The force required for actuation of the second sensor preferably is small compared to the force of the pretensioned spring and preferably is less than 20 percent of the force of the pretensioned spring.

A second detent stop can be provided for limiting the deflection of the side wall relative to the drive lever.

A fourth sensor and a fifth sensor can be connected to the control system and coordinated to the electromechanical drive to provide signals for limiting the rotary motion of the cam disk in a first rotary direction or, respectively, in a second opposite rotary direction.

The slot can be expanded by displacing the side wall to the side against the force of the spring elastic connection by applying manual pressure on a contactng area that can be provided on the side wall. Whereupon, the third sensor can send signals to the control system for expanding the slot. When there is no manual displacement of the side wall but the first sensor is actuated and the second sensor is not, the electromechanical drive can be controlled such that the slot becomes narrower. The drive can be stopped when there is no manual displacement of the side wall but there is an actuation of the second sensor.

The prefold of the prefolded, foldable sheet pieces can be angled at an angle of about 90 degrees with respect to a part of the sheet piece directly supported by the support.

In another embodiment of the present invention, the electromechanical drive means can include an electric motor and can further comprise a spindle coupled to the electric motor and engaging a gear rack disposed at the end of a first axle that rotatably supports a drive lever. A second axle can tiltably support the side wall. The spring elastic connection between the electromechanical drive and the side wall can include a pretensioned spring and a detent for providing a rest position to the side wall and to the drive lever under the action of the pretensioned spring.

In yet a third embodiment of the present invention, the electromechanical drive means can include an electric motor and can further comprise a support arm for supporting the side wall, a first axle rotatably supporting a drive lever that is engaged by the electric motor and a second axle for tiltably supporting the side wall. The spring elastic connection between the electromechanical drive and the side wall can include a clamping spring between the drive lever and the support arm.

In another possible embodiment, the side wall can include an inner metal part and can have a surface covering formed from a plastic material.

Another aspect of the present invention provides a method for isolating of prefolded, foldable sheet pieces that comprising the following: A support, which has a ledge joining the support at an edge and making an angle of about 90 degrees with the plane of the support, is provided for placing a stack of sheet pieces. A side wall, which is disposed opposite to the ledge and makes an absolute angle of more than about 60 degrees with a plane of the support, is disposed against the placed sheet pieces supports and guides the placed sheet pieces at their side. The motion of the side wall is controlled by a control system for actuating an electromechanical drive, where the control system is connected to a first sensor that is disposed at the support and responds to sheet pieces placed on the support, to a second sensor that is disposed at the ledge of the support and responds to a force directed against the plane of the ledge of the support, and to a third sensor that is disposed at the side wall and responds to a motion of the side wall for expanding a slot formed between the ledge of the support and the side wall. The width of the slot is changed by actuating the side wall with the electromechanical drive, which is connected to the side wall by a spring elastic connection between the electromechanical drive and the side wall, which acts against the force exerted by the drive on the side wall. The side wall is moved such that the width of the slot is adjustable and the slot is adapted for receiving of prefolded sections of sheet pieces. A lowest level sheet piece is serially removed in each case with a sheet piece separator.

In this method, the electromechanical drive means can include an electric motor and can further comprise coupling a cam disk to the electric motor, rotatably supporting at a first axle a drive lever engaging the cam disk, tiltably supporting the side wall with a second axle, and including in the spring elastic connection between the electromechanical drive and the side wall a pretensioned spring and a detent stop for providing a rest position to the side wall and to the drive lever under the action of the pretensioned spring. The force required for actuation of the second sensor is preferably small compared to the force of the pretensioned spring.

The deflection of the side wall relative to the drive lever can be limited with a second detent stop.

A fourth sensor and a fifth sensor can be connected to the control system for providing signals for limiting the rotary motion of the cam disk in a first rotary direction and, respectively, in a second opposite rotary direction.

The side wall can be manually displaced to the side to expand the slot against the force of the spring elastic connection to induce the third sensor to send signals to the control system to expand the slot. When there is no manual displacement of the side wall but there is an actuation of the first sensor and no actuation of the second sensor, the electromechanical drive can be controlled such that the slot becomes narrower. The electromechanical drive can be stopped when there is no manual displacement of the side wall but there is an actuation of the second sensor.

In another embodiment of the method of the present invention, the electromechanical drive means can include an electric motor and can further comprise coupling a spindle to the electric motor, rotatably supporting a drive lever at a first axle having a gear rack at its end for engaging the spindle, tiltably supporting the side wall with a second axle, and including a pretensioned spring and a detent stop in the spring elastic connection for providing a rest position to the side wall and to the drive lever under the action of the pretensioned spring.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3 is a schematic view of a third embodiment of the invention device,

FIG. 5 is a schematic diagram illustrating the control and actuation provisions of the invention.

DESCRIPTION OF INVENTION AND PREFERRED EMBODIMENTS

Figure 2:
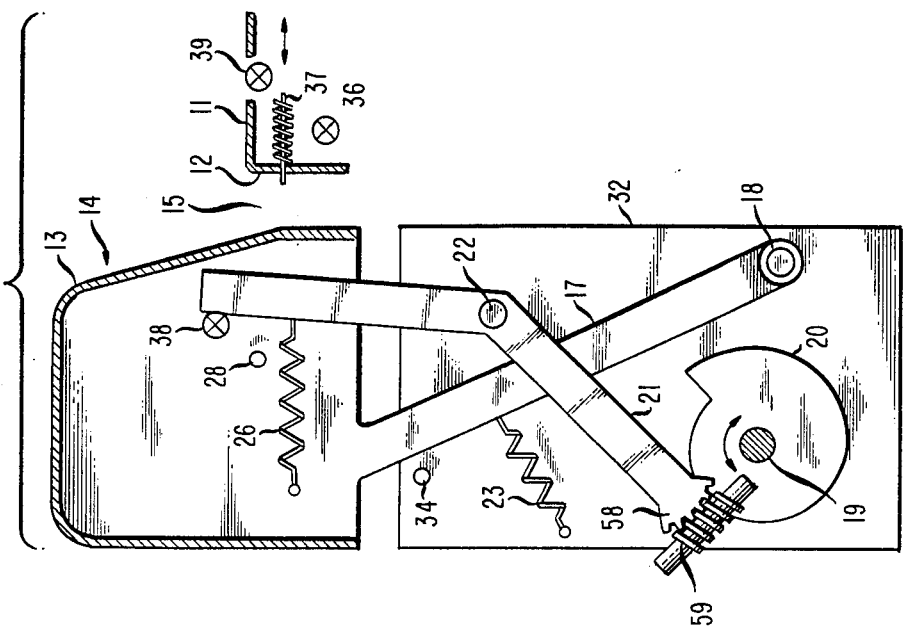
FIG. 2 is a schematic view of second embodiment of the invention device.

In accordance with the present invention there is provided a device which separates prefolded, foldable sheet pieces, in particular, letter envelopes with a flap. The device includes a support 11 for supporting stacks of letter envelope pieces. A feed segment is provided for serially withdrawing in each case the lowest sheet piece. A side wall 13 is provided to support and guide the sheet pieces placed on the support. A slot 15 is disposed between the side wall 13 and the ledge 12 of the support 11 turned toward the side wall 13 for receiving prefolded parts of the sheet pieces, which are prefolded at an angle of about 90 degrees. An electromechanical drive 20, 21 is provided for changing the width of the slot 15 and is operated by a coordinated control system. A first sensor 39 disposed in the support 11 is responsive to the placement of sheet pieces. A second sensor 36 disposed at the ledge 12 of the support 11 is responsive to a force in the direction of the ledge 12. A third sensor 38 at the side wall 13 is responsive to the deflection of the side wall 13 for expanding the slot 15. A spring elastic connection connects the drive 20, 21 with the side wall 13.

The electromechanical dirve 20, 21 can comprise an electric motor, a curved cam disk 20 coupled with the electric motor, and a drive lever 21 that is disposed around a first axis 22 and is in a constant force transmitting connection with the curved cam disk 20. The side wall 13 can be disposed rotatable around a second axis 18. The connection of the drive 20, 21 and of the side wall 13 can be provided by a pretensioned spring 26 and by a stop 28. The side wall 13 and the drive lever 21 can rest at the stop 28 under the action of the spring 26. The force for actuating the second sensor 36 can be small compared to the force of the pretensioned spring 26 and is preferably less than 20% of the force of the pretensioned spring 26 and more preferably less than 5% of the force of the pretensioned spring 26. A second stop 34 can be provided to limit a deflection of the side wall 13 relative to the drive lever 21. A fourth and a fifth sensor 51, 52 can be coordinated to the drive and can limit with their signals the rotary motion of the curved cam disk 20 in one or, respectively, the other rotary direction.

The side wall 13 can be manually moved sideways for expanding the slot 15 against the force of the spring elastic connection. The third sensor 38 can thereby control the drive such that the slot 15 becomes wider. With no manual deflection of the side wall 13 and where the first sensor 39 is actuated and the second sensor 36 is not, the drive can be so controlled that the slot 15 becomes smaller. With no manual deflection of the side wall 13 and where the second sensor 36 is actuated, the drive can be stopped.

Figure 4:
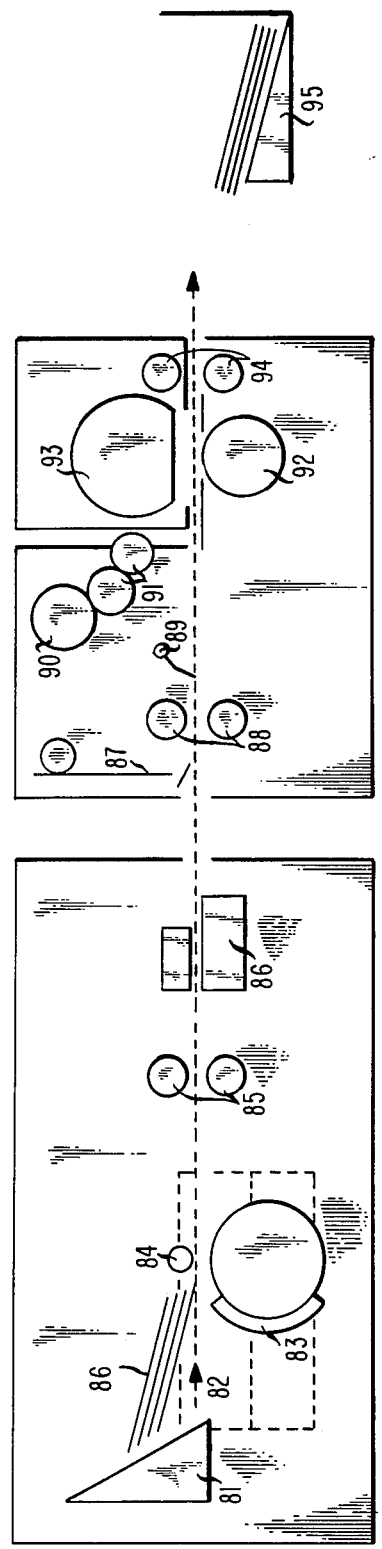
FIG. 4 is a schematic diagram illustrating the invention device in a postage metering machine.

Referring now to FIG. 4, there is shown a schematic diagram of the invention device in connectin with a postage metering machine. A feed-in for loading the machine with envelopes is shown at 81. The invention device for open envelope positioning is located at 82, a feed section 83 serves to move the envelopes, and a letter separator 84 ensures that only a single envelope is moved at a time. Transport rollers 85 move the envelope to an envelope moistener 86. A manual label release 87 is provided for manual operation. The envelope is further moved by feed-in rollers 88 and passes a release fork 89. An ink reservoir 90 is connected to an inking unit 91 providing ink. A pressure roller 92 places the envelope against a rotor 93 provided with ink for stamping the envelopes. The envelope is further moved by discharge rollers 94 into a letter collecting tray 95.

Figure 1:
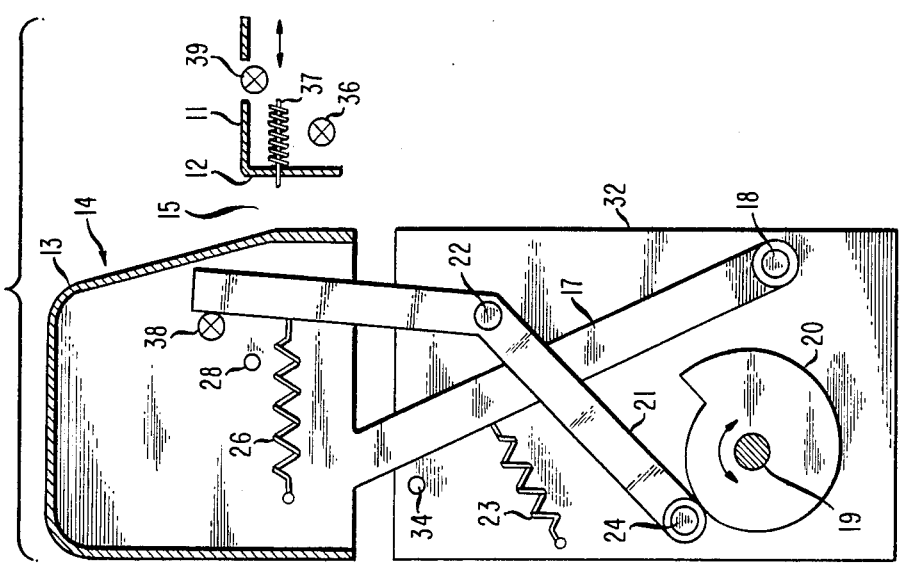
FIG. 1 is a view of a schematic sketch through the invention device.

FIG. 1 shows an in part sectional side view of the letter envelope flap guide of a postage metering machine. This letter envelope flap guide is provided with a support 11 onto which the envelopes, shown at 86 in FIG. 4, are placed. A feed segment grips through the support 11 and moves serially in each case the lower most envelope in a direction perpendicular to the plane of FIG. 1 to a metering machine such as for example illustrated in FIG. 4. A sensor 39 is placed into the support 11 and detects if at least one envelope is placed on the support 11 or not. A side wall 13 serves to support the stack of envelopes at the side. If envelopes with a closed flap are placed on the support 11, then a slot 15 between the side edge 12 of the support 11 and the side wall 13 is essentially closed, that is, it exhibits a minimum width. If, in contrast, the envelopes with half opened flaps are placed on the support 11, then the slot 15 has to be of such width that it receives the flaps of a full stack of letter envelopes. In fact the stack of envelopes has to received without being clamped. The rest position of the device is therefore such that the side wall 13 is removed relative to the ledge 12, that is, the slot exhibits a maximum width.

The mechanism for adjustment of the slot 15 is as follows: The side wall 13 is preferably supported by two support arms 17. The view of FIG. 1 makes only one of the two arms 17 visible. The two support arms 17 are rotatable around an axle 18, thus the side wall 13 becomes rotatable around the axis 18.

An electromechanical drive 20, 21 serves to move the side wall 13. The drive system is schematically illustrated in FIG. 5. An electric motor 69 is connected to a curved cam disk 20 for rotating the disk in two rotary directions, which is indicated by an arrow shown in FIG. 1. The cam disk rotates around an axis 19. A drive lever 21 is in continuous engagement contact with this curved disk 20. The drive lever 21 can be rotatably supported at a second axis 22. The continuous engagement contact can be achieved by either the action of a spring 23, which engages at a lever 21 or at the support arm 17 in a suitable fashion or alternatively by a guiding of the contact wheel 24 of the drive lever 21 by a suitable curbed disk.

The side wall 13 is spring elastically connected to the free end of the drive lever 21. For this purpose for example, a pretensioned tension spring, which is stretched between the drive lever 21 and the side wall 13, can be employed. A detent stop 28 can serve to provide a rest position for the side wall 13 and the lever 21 under the tension of the spring 26.

A further detent stop 34 can be disposed in the stationary part 32 at which, for example, the axles 18, 19 and 22 are attached. The detent stop 34 limits the deflection of the support arm 17 in one direction.

An electronic and preferably automatic control circuit 61 as indicated in the block diagram of FIG. 5 can be provided for controlling the drive motor. A power supply 63 feeds the power to a switch means 65 that is controlled by the automatic control circuit 61. Preferably a current limiter 67 is connected to the switch means and the electric motor 69 is then connected to the current limiter. The control circuit of the device receives logic signals from three sensors, which signals are transformed by the electronics into control signals for the drive motor.

The first sensor 39, as mentioned, above is mounted on the support 11 and detects the presence of letter envelopes. The second sensor 36 is provided in the edge ledge 12 of the support 13, and the third sensor 38 is disposed at the side wall 13. The sensors can be provided as microswitches or preferably as optoelectric detectors such as, for example, reflection detectors or fork light barriers or other transducers. Such transducers are described for example in the book Electronic Instrumentation, 2nd Edition by Sol D. Prensky, published by Prentice Hall Inc. Englewood Cliffs, N.J., 1971, or in *Taschenbuch Betriebsmesstechnik*, edited by Klaus Cötte et al., 2nd edition, VEB VERLAG TECHNIK BERLIN, 1974.

The second sensor 36 responds to side pressure in the direction of the ledge 12. For example, a spring loaded pin 37 is provided for acceptance of this pressure, where the pressure force for this pin 37 is small compared to the force of the pretensioned spring 26.

The third sensor 38 responds to the relative shifting between the free end of the drive lever 21 and the side wall 13. The resting of the drive lever 21 at the detent stop 28 corresponds to the rest position of this sensor 38.

The device operates as follows: As already mentioned, the rest position is defined as the position where the slot 15 exhibits maximum width. If now a stack of letter envelopes with open flaps is inserted onto the support, then the first sensor 39 responds, the motor is turned on and the slot 15 is narrowed until the second sensor 36 also responds. This occurs when all envelope flaps are disposed closely spaced in the slot 15. Now the separation or isolation of the envelopes can start. Successively, in each case the lowermost envelope is transported away. Thereby successively additional space is generated for the remaining flaps in slot 15 such that the second sensor 36 can return to its rest position. This again gives a starting signal for the motor, which narrows the slot 15 until the second sensor again responds.

In this way, the slot 15 successively narrows until it reaches its minimum width. In this case the last letter envelope was transported or is to be transported such that the first sensor 39 responds and a signal is provided for reversing the direction of rotation of the motor. Thereby the slot 15 is again opened and the side wall 13 again reaches its rest position.

These automatic processes can be interrupted at any time if the side wall 13 is manually pressed back against the force of the spring 26, that is, in the direction of the arrow 14. This manual action immediately causes a widening of the slot 15 to be generated such that for example more letter envelopes can be added to a stack already present. In addition, the third sensor 38 and possibly also the second sensor 36 respond. Due to this at any rate the motor is started in a backward rotational direction such that the curved cam disk 20 is rotated such that the drive lever 21 finally rests at the detent stop 28. This can be the position in which the support arms 17 rest at the second detent stop 34 or any intermediate position. As soon as this position is reached, this is reported by a signal from the sensor 38 and the motor is thereby redirected and now, via the curved cam disk 20, the drive lever and the tension spring 26, pushes the side wall 13 toward the ledge 12. The side wall 13 thereby presses the flaps of the letter envelopes against the ledge 12 in the manner described, whereby the first sensor 36 responds and stops the motor.

In order to ensure that there is not overdriving of the curved cam disk 20, this disk can be coupled to two further sensors 51, 52, for example via slots or holes 55, 56 in the disk 20 (FIG. 3) that serve to limit the angle of motion. A further safety feature, one that provides a limitation of the current fed to the electric motor, is recommended. This can be provided by the current limiter 67 indicated in FIG. 5. Upon a possible blockage of the motor, this current limiter can restrict the magnitude of the current to such a value that the motor is not damaged.

The device can be modified in multiple ways without changing the basic principles of the invention. Such variations include for example:

Driving the drive lever over a spindle rather than over the curved cam disk 20 (illustrated in FIG. 2). A spindle 59 is rotated by the drive motor and actuates a curved gear 58 as in a rectilinear vibrating motion.

A clamping spring 54 disposed between the drive lever 21 and the support arm 17, as shown in FIG. 3, can be substituted for the tension spring 26.

The geometry of the side wall 13, the support arm 17, and of the drive lever 21 can be changed, for example so that the axles 18 and 22 can be combined in a single axle for a simplification.

It is further advantageous if the side wall 13 is composed of two parts where in fact an inner metal part, which merges without seams into the support arm 17, is employed, and where a covering is provided by injection molded or drawn plastic.

Prefolded, foldable sheets pieces other than letter envelopes could be, for example, postcards with self-adhesive flaps for addresses.

It will be understood that each of the elements described above, or two or more together, may also find a useful application in other types of sheet separating devices and procedures differing from the types described above.

While the invention has been illustrated and described as embodied in the context of a device for separating prefolded, foldable sheets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for isolating of prefolded, foldable sheet pieces comprising
    a support for placing a stack of sheet pieces, which support has a ledge joining the support at an edge;
    a sheet piece separator for serial removal of a lowest level sheet piece in each case;
    a side wall disposed opposite to the ledge and making an angle of more than about 60 degrees with a plane of the support for supporting and guiding the placed sheet pieces at a side of the sheet pieces, where a slot is formed between the ledge of the support and the side wall and where the width of the slot is adjustable and where the slot is adapted for receiving of prefolded sections of sheet pieces;
    an electromechanical drive means connected to the side wall for changing the width of the slot;
    a control system for actuating the electromechanical drive means; a first sensor disposed at the support and connected to the control system, where the first sensor responds to sheet pieces placed on the support;
    a second sensor disposed at the ledge of the support and connected to the control system, where the second sensor responds to a force directed against the plane of the ledge of the support; a third sensor disposed at the side wall and connected to the control system, where the third sensor responds to a motion of the side wall for expanding the slot; and
    a spring elastic connection between the electromechanical drive means and the side wall.

2. The device for isolating of prefolded, foldable sheet pieces according to claim 1 wherein the electromechanical drive means includes an electric motor; and further comprising
    a cam disk coupled to the electric motor;
    a first axle;
    a drive lever rotatably supported at the first axle and engaging the cam disk;
    a second axle for tiltably supporting the side wall; and wherein the spring elastic connection includes a pretensioned spring and a detent stop for providing a rest position to the side wall and to the drive lever under the action of the pretensioned spring.

3. The device for isolating of prefolded, foldable sheet pieces according to claim 2 wherein the force required for actuation of the second sensor is small compared to the force of the pretensioned spring.

4. The device for isolating of prefolded, foldable sheet pieces according to claim 2 wherein the force required for actuation of the second sensor is less than 20 percent of the force of the pretensioned spring.

5. The device for isolating of prefolded, foldable sheet pieces according to claim 2 further comprising a second detent stop for limiting the deflection of the side wall relative to the drive lever.

6. The device for isolating of prefolded, foldable sheet pieces according to claim 2 further comprising a fourth sensor connected to the control system and coordinated to the electromechanical drive means for providing signals for limiting the rotary motion of the cam disk in a first rotary direction.

7. The device for isolating of prefolded, foldable sheet pieces according to claim 6 further comprising a fifth sensor connected to the control system and coordinated to the electromechanical drive means for providing signals for limiting the rotary motion of the cam disk in a second rotary direction.

8. The device for isolating of prefolded, foldable sheet pieces according to claim 1 further comprising
a contacting area of the side wall for manually displacing the side wall to the side for expanding of the slot against the force of the spring elastic connection and whereby the third sensor sends signals to the control system for expanding of the slot; and
where upon an absence of a manual displacement of the side wall and in case of an actuation of the first sensor and in case of a non-actuation of the second sensor the electromechanical drive means is controlled such that the slot becomes narrower; and
where upon an absence of a manual displacement of the side wall and in case of an actuated second sensor the drive is stopped.

9. The device for isolating of prefolded, foldable sheet pieces according to claim 1 wherein the prefold is angled at an angle of about 90 degrees versus a part of the sheet piece directly supported by the support.

10. The device for isolating of prefolded, foldable sheet pieces according to claim 1 wherein the electromechanical drive means includes an electric motor; and further comprising
a spindle coupled to the electric motor;
a first axle;
a drive lever rotatably supported at the first axle and having a gear rack at its end for engaging the spindle;
a second axle for tiltably supporting the side wall;
and wherein the spring elastic connection includes a pretensioned spring and a detent for providing a rest position to the side wall and to the drive lever under the action of the pretensioned spring.

11. The device for isolating of prefolded, foldable sheet pieces according to claim 1 wherein the electromechanical drive means includes an electric motor; and further comprising
a support arm for supporting the side wall;
a first axle;
a drive lever rotatably supported at the first axle and engaged by the electric motor;
a second axle for tiltably supporting the side wall;
and wherein the spring elastic connection includes a clamping spring between the drive lever and the support arm.

12. The device for isolating of prefolded, foldable sheet pieces according to claim 1 wherein the side wall includes an inner metal part and a surface of a plastic material.

13. A method for isolating of prefolded, foldable sheet pieces comprising
providing a support for placing a stack of sheet pieces, which support has a ledge joining the support at an edge at an angle of about 90 degrees;
controlling the motion of a side wall disposed opposite to the ledge and making an angle of more than about 60 degrees with a plane of the support against the placed sheet pieces for supporting and guiding the placed sheet pieces at a side of the sheet pieces, with a control system for actuating an electromechanical drive based on a first sensor disposed at the support and connected to the control system, where the first sensor responds to sheet pieces placed on the support, a second sensor disposed at the ledge of the support and connected to the control system, where the second sensor responds to a force directed against the plane of the ledge of the support, and a third sensor disposed at the side wall and connected to the control system, where the third sensor responds to a motion of the side wall for expanding a slot formed between the ledge of the support and the side wall;
actuating the side wall with the electromechanical drive connected to the side wall for changing the width of the slot against a spring elastic connection between the electromechanical drive and the side wall;
moving the side wall such that the width of the slot formed between the ledge of the support and the side wall is adjustable and such that the slot is adapted for receiving of prefolded sections of sheet pieces; and
serially removing a lowest level sheet piece in each case with a sheet piece separator.

14. The method for isolating of prefolded, foldable sheet pieces according to claim 13 wherein the electromechanical drive means includes an electric motor; and further comprising
coupling a cam disk to the electric motor;
rotatably supporting a drive lever at a first axle and engaging the cam disk;
tiltably supporting the side wall with a second axle;
and wherein the spring elastic connection includes a pretensioned spring and a detent stop for providing a rest position to the side wall and to the drive lever under the action of the pretensioned spring.

15. The method for isolating of prefolded, foldable sheet pieces according to claim 13 wherein the force required for actuation of the second sensor is small compared to the force of the pretensioned spring.

16. The method for isolating of prefolded, foldable sheet pieces according to claim 13 further comprising
limiting the deflection of the side wall relative to the drive lever with a second detent stop.

17. The method for isolating of prefolded, foldable sheet pieces according to claim 13 further comprising
connecting a fourth sensor to the control system for providing signals for limiting the rotary motion of the cam disk in a first rotary direction; and
connecting a fifth sensor connected to the control system for providing signals for limiting the rotary motion of the cam disk in a second rotary direction.

18. The method for isolating of prefolded, foldable sheet pieces according to claim 13 further comprising
manually displacing the side wall to the side for expanding of the slot against the force of the spring elastic connection for inducing the third sensor to send signals to the control system for expanding of the slot;

controlling the electromechanical drive such that the slot becomes narrower upon an absence of a manual displacement of the side wall and in case of an actuation of the first sensor and in case of a non-actuation of the second sensor; and stopping the electromechanical drive upon an absence of a manual displacement of the side wall and in case of an actuated second sensor.

19. The method for isolating of prefolded, foldable sheet pieces according to claim 13 wherein the electromechanical drive means includes an electric motor; and further comprising coupling a spindle to the electric motor;

rotatably supporting a drive lever at the first axle and having a gear rack at its end for engaging the spindle;

tiltably supporting the side wall with a second wall; including in the spring elastic connection a pretensioned spring and a detent for providing a rest position to the side wall and to the drive lever under the action of the pretensioned spring.

* * * * *